J. BACHE-WIIG.
SYNCHRONOUS DYNAMO ELECTRIC MACHINE.
APPLICATION FILED FEB. 3, 1910.
980,183.
Patented Jan. 3, 1911.
2 SHEETS—SHEET 2.
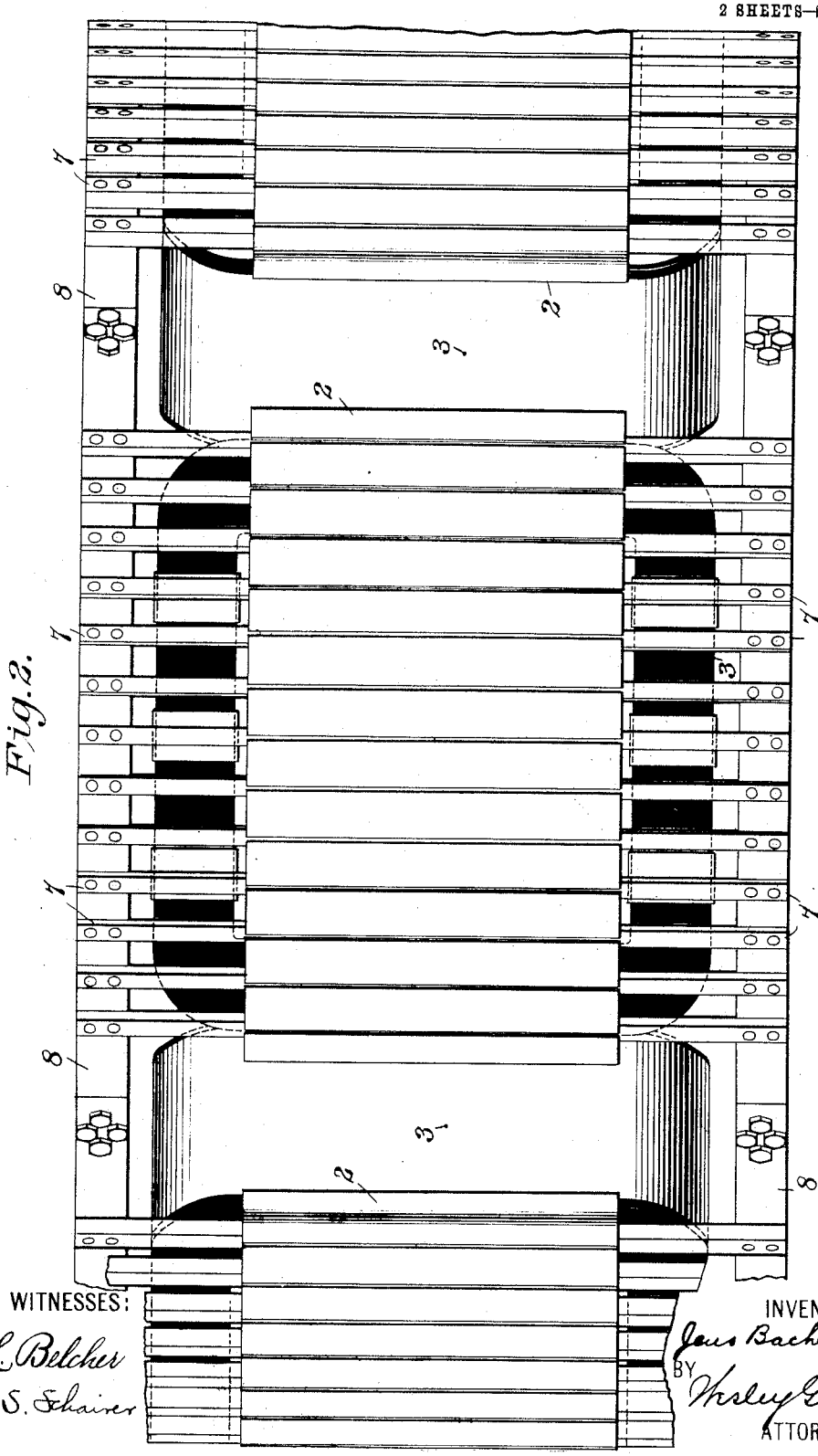

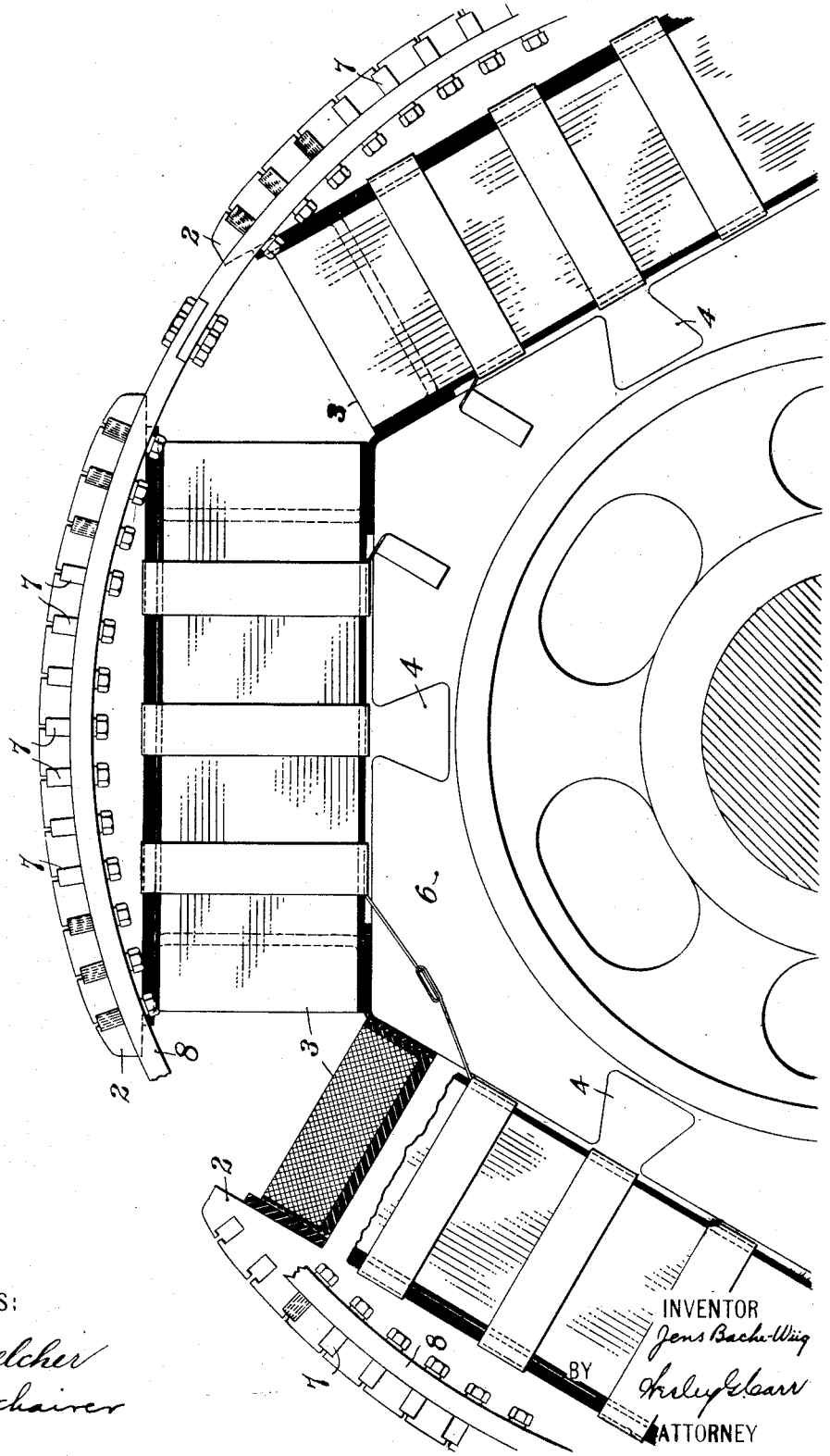

UNITED STATES PATENT OFFICE.

JENS BACHE-WIIG, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

SYNCHRONOUS DYNAMO-ELECTRIC MACHINE.

980,183.  Specification of Letters Patent.  Patented Jan. 3, 1911.

Application filed February 3, 1910. Serial No. 541,818.

*To all whom it may concern:*

Be it known that I, JENS BACHE-WIIG, a subject of the King of Norway, and a resident of Edgewood Park, in the county of Allegheny and State of Pennsylvania, have invented a new and useful Improvement in Synchronous Dynamo-Electric Machines, of which the following is a specification.

My invention relates to dynamo-electric machines and particularly to synchronous alternating current machines.

The object of my invention is to provide simple, effective and relatively inexpensive means for preventing hunting of the speed or oscillations of the current in synchronous current machines, and for enabling such machines to be readily started as non-synchronous or induction motors.

Figure 1 of the accompanying drawing is a view, in end elevation, of a portion of a machine that embodies my invention, and Fig. 2 is a view, in side elevation, of the same parts.

In the construction of synchronous alternating current motors, it is usually necessary to provide means for preventing oscillations of the current therein, which oscillations may result from a non-uniformity of the speed of the engine that drives the generator supplying the distributing circuit, or from large resistance losses in the distributing circuit, or from both causes. Such means have heretofore comprised low-resistance short-circuited windings surrounding the whole, or parts, of the extremities of the field magnet polar projections, the said windings being the most effective when placed near the edges of the poles, where the magnetic flux variation is usually the greatest. If properly arranged, a short-circuited winding upon the extremities of the field magnet polar projections may be utilized also in starting the motor and bringing it up to synchronous speed, current, for that purpose, being applied to the armature winding, which temporarily serves as the primary winding of an induction motor of which the short-circuited winding upon the field magnet polar projections constitutes the secondary winding. In order that a relatively large starting torque may be obtained, the short-circuited secondary winding should, of course, be of relatively high resistance. It will be noted, therefore, that while, for the purpose of damping the oscillations of current, the short-circuited winding upon the polar projections should be of low resistance, for the purpose of obtaining a high starting torque when the machine is operating as a non-synchronous motor, it should be of relatively high resistance. Instead of providing two windings, each adapted to its particular purpose, it is the object of the present invention to provide a single winding that shall be effective for both purposes.

The machine here illustrated comprises a field magnet core structure having a plurality of polar projections 2 that are surrounded by coils 3 constituting an exciting winding, the field structure, in the present instance, being rotatable, and the polar projections 2 being secured, by means of dovetail projections 4, to a central spider or supporting member 6. Adjacent to their peripheral faces, the polar projections 2 are provided with transverse slots in which conducting bars 7 are located, the bars being secured, at their extremities, to segmental conducting rings 8 to form closed-circuit windings for the ends of the polar projections. The rings 8 are preferably composed of copper or some other comparatively low-resistance material, though, for some purposes, it may be found desirable to construct them of high-resistance material.

Since the greatest effectiveness in preventing hunting of the motor speed and oscillations of the current in the alternating current circuit to which the motor is connected is afforded by short-circuited windings of low resistance which are located near the edges of the polar projections where the magnetic flux variation is greatest, the three conducting bars which are located nearest the edges of the polar projections of the machine here illustrated are composed of copper or other suitable low-resistance material. The bars near the middle portions of the polar faces are composed of steel or other relatively high-resistance material, and, while they have some effect as dampers, when combined with the conductors near the edges of the poles, their primary function is that of a closed-circuit secondary winding which permits the machine to be started and brought up to speed as a non-synchronous induction motor. Since the effective resistance of the secondary winding is dependent upon the resistances of both the copper and the steel conductors, which are parts thereof, it is evident that the effective resistance of the winding is greater than it would be if all of the conductors were composed of copper. Consequently, it is possible to obtain a relatively high starting torque. At the same time, the winding has substantially the same effectiveness as a damper that it would have if all of the conductors were composed of copper.

I claim as my invention:

1. A synchronous dynamo-electric machine comprising polar projections having transverse peripheral slots, and conducting bars located in the slots and constituting parts of a closed-circuit winding, the bars near the edges of the polar projections being of lower resistance than those near the centers thereof.

2. A synchronous dynamo-electric machine comprising polar projections, and a plurality of conductors supported near the faces of the polar projections and constituting parts of a closed-circuit winding, the conductors near the edges of the polar projections being of less resistance than those near the centers thereof.

3. In a synchronous dynamo-electric machine, the combination with polar projections, of a distributed closed-circuit winding for each of said projections comprising a plurality of transverse conductors, those near the edges of the polar projections being of less resistance than those at the centers thereof, and conductors joining the extremities of the transverse conductors.

4. A synchronous dynamo-electric machine comprising polar projections, a plurality of conducting bars supported near the faces of the polar projections, the bars near the edges of the pole pieces being of less resistance than those near the centers thereof, and relatively low-resistance conductors connecting the ends of the said bars.

In testimony whereof, I have hereunto subscribed my name this 27th day of Jan., 1910.

JENS BACHE-WIIG.

Witnesses:
R. A. SIMPSON,
B. B. HINES.